United States Patent
Casey

[11] Patent Number: 5,371,968
[45] Date of Patent: Dec. 13, 1994

[54] FISHING LURE CARRIER

[76] Inventor: Dennis A. Casey, 2896 County Rd. JJ, Neenah, Wis. 54956

[21] Appl. No.: 106,582

[22] Filed: Aug. 16, 1993

[51] Int. Cl.⁵ ............................................... A01K 97/05
[52] U.S. Cl. ...................................... 43/25.2; 43/54.1; 206/315.11
[58] Field of Search ............................. 43/25.2, 54.1; 206/315.11, 362.2; 220/347

[56] References Cited

U.S. PATENT DOCUMENTS

| 908,338 | 12/1908 | Sheble et al. | 43/57.1 |
|---|---|---|---|
| 2,364,807 | 12/1944 | Nelson, Jr. | 43/57.1 |
| 2,514,645 | 7/1950 | Jardine | 43/25.2 |
| 5,044,500 | 9/1991 | Webber et al. | 220/347 |
| 5,079,863 | 1/1992 | Gillespie | 43/25.2 |
| 5,220,742 | 6/1993 | Lewis | 43/25.2 |

FOREIGN PATENT DOCUMENTS

| 732817 | 4/1966 | Canada | 43/25.2 |
|---|---|---|---|
| 2706065 | 8/1978 | Germany | 206/362.2 |

*Primary Examiner*—P. Austin Bradley
*Assistant Examiner*—Jeanne M. Elpel
*Attorney, Agent, or Firm*—R. Jonathan Peters

[57] ABSTRACT

A carrier or receptacle for a fishing lure attached to a fishing line comprises a housing adaptable for receiving the lure and having a base, opposed side walls, and opposed end walls. The side walls and end walls extend upwardly from the base, and are substantially parallel to each other thereby forming a generally box-like structure or housing. The housing further includes a slidable cover spaced from the base and substantially parallel thereto, which is adaptable for sliding between an open and closed position, thereby providing an enclosure or container for the lure.

9 Claims, 1 Drawing Sheet

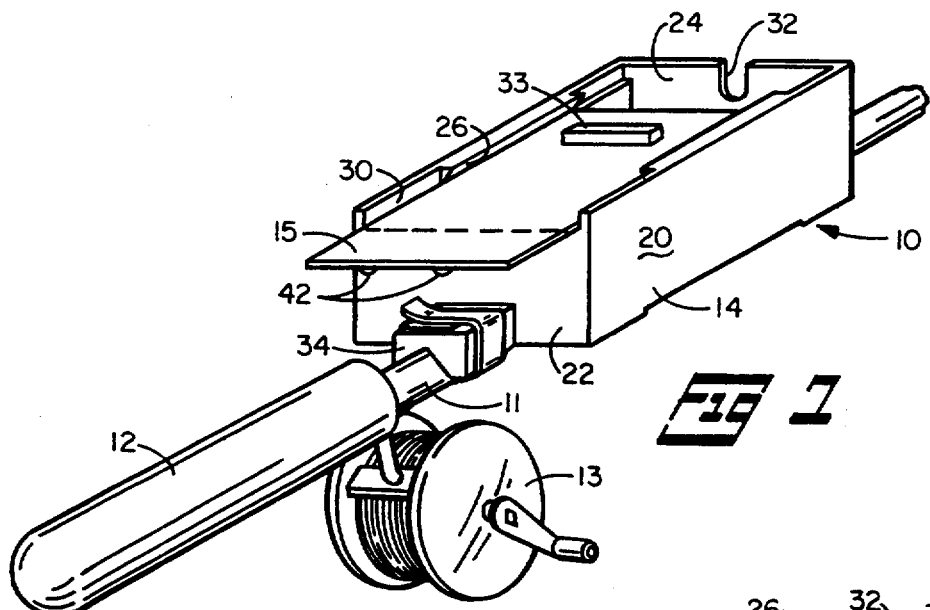
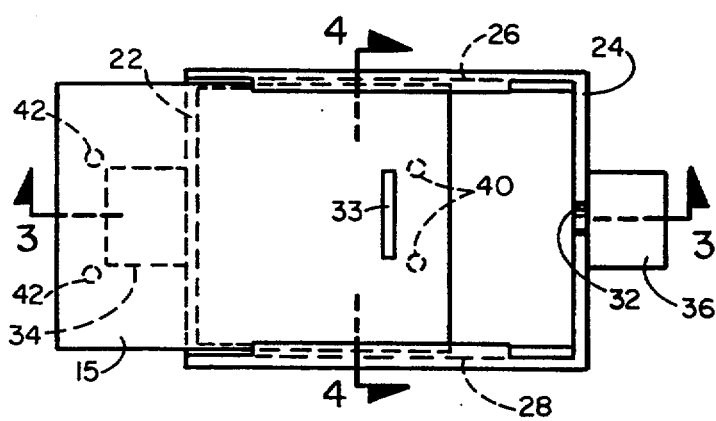
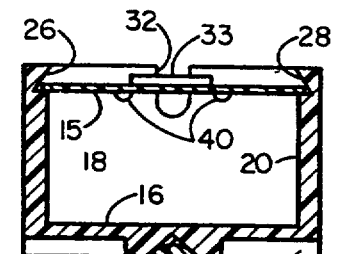
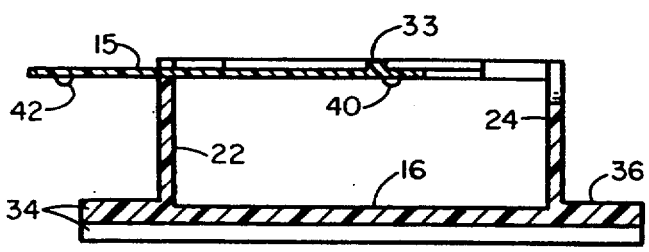
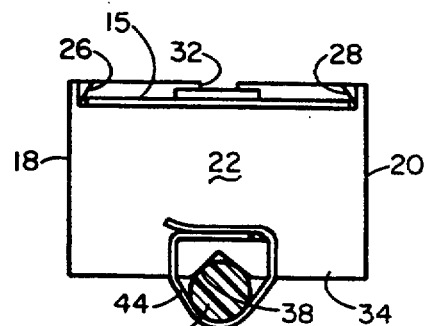

FISHING LURE CARRIER

FIELD OF INVENTION

This invention relates to a carrier for a fishing lure and the like. In its more specific aspect, this invention relates to a carrier or receptacle for a fishing lure and the like for housing the lure in a safe and convenient manner while the lure is in place on the rod and line.

BACKGROUND AND PRIOR ART

All too frequently, a fishhook or lure can be a nuisance or even a hazard in that the barb can become entangled with clothing, plants, other fishing tackle, or boat fixtures while the lure is in place on the rod and line and being carried or stored. The prior art shows several types of carriers mountable on the fishing rod for holding the lure as a means for solving this problem. For example, a number of patent references disclose a box-like structure or receptacle having hinged complementary halves or sections which mate on closing, and typically provide a clip, latch or snap for retaining the structure in a closed position. These references include U.S. Pat. Nos. 3,141,258; 4,015,361; and 4,884,357; and Canadian Patent Nos. 732,817; and 746,222. Also, U.S. Pat. No. 2,849,825 discloses halve section pivoted together and retained in a closed position by means of a spring tab. These prior art carriers have certain disadvantages or problems in the structure or design of the structure. One noticeable disadvantage or problem is the tendency for the cover to snap open, particularly during casting when the rod is given a sudden jerk. Even though the lure may not be in the receptacle during casting, it is an annoyance to the fisherman to have the cover flapping about. Additionally, a hinged-type receptacle or a receptacle with a latch or clip as the closure means, invariably have protuberances or projections extending beyond the exterior wall portions of the carrier, and any such extension or jutting is inherently disadvantageous for the line or barb can get caught on the protuberance.

This invention has therefore as its purpose to provide a carrier for receiving and holding a lure that overcomes the disadvantages of the prior art.

It is another object of the invention to provide such a carrier that can be readily mounted to the fishing rod by the fisherman, either temporarily or permanently, or can be provided as a part of the rod by the manufacturer of the rod.

It is still a further object of the invention to provide a carrier of such type that can be manufactured easily and inexpensively.

SUMMARY OF THE INVENTION

In accordance with my invention, I provide a carrier for a fishing lure, hook, or the like, mountable to the rod as required by the fisherman, or to be provided by the rod manufacturer as an integral part of the rod. That is, the carrier can be provided as a separate unit and mounted onto the rod shaft or handle by the fisherman in order to maintain the lure in a safe and convenient place while the lure is in place on the rod line as it is being carried or stored. Thus, it is possible to retrofit a rod with the carrier of my invention, or to provide the carrier as a prefit to the rod by the rod manufacturer. The carrier or receptacle for the fishing lure attached to a fishing line comprises, in general, a housing adaptable for receiving the lure and having a base, opposed side walls, and opposed end walls. The side walls and end walls extend upwardly from the base, and are substantially parallel to each other thereby forming a generally box-like structure or housing. The housing further includes a slidable cover spaced from the base and substantially parallel thereto, which is adaptable for sliding between an open and closed position, thereby providing an enclosure or container for the lure.

It should be understood that the term "lure" as used herein and in the appended claims is intended to include all types of fishing tackle having a barb, including a plain hook.

Each side wall is provided with a guide gib extending longitudinally thereof and spaced remotely from the base. Each guide gib is adaptable to receive the cover, or slidable bearing portions thereof such as the opposed, longitudinal marginal edges, for slidable movement along said guide gib. In accordance with a more specific embodiment of the invention, a guide gib is disposed on the interior side or face of each side wall extending longitudinally between the end walls. One end wall has a horizontally disposed, elongated recess at the top marginal edge or periphery, and the recess extends for substantially the full width of the wall and between the guide gibs. In this manner, the cover can slide between an open and closed position along the guide gibs and across the recessed portion of the end wall and seat on the peripheral edge of the recessed portion for support. When the cover is moved to a closed position, the opposite edge of the cover will abut the second or opposed end wall thereby preventing the cover from sliding off the housing. Also, this opposed end wall has a peripheral slot, preferably centrally located between the side walls, adaptable to receive the fishing line when the lure is positioned in the housing.

In an alternative embodiment of my invention, the guide gibs are disposed exteriorly of the side walls. The cover is of such size and configuration as to seat on the top marginal edges of the side walls, with the periphery of the cover extending slightly beyond the side walls. The extending cover has downwardly depending, longitudinally disposed flange members with inwardly disposed slidable bearing portions or side rails adaptable for slidable engagement in the guide gibs which are grooved to provide a sliding tongue and groove connection between the gib and rail and to permit the cover to reciprocate between an open and closed position. The horizontal marginal edge of one end wall is disposed below the cover so as to permit the cover to slide in the guide gibs over or across this horizontal edge. The opposed end wall extends upwardly about the width of the cover to serve as a stop means for retaining the cover when in a closed position.

It is preferable to provide the cover with stop means to delimit the opening position of the cover, which preferably comprises one or more detents formed integrally with the underside of the cover for abutment with the end wall when the cover is slid to an open position. Further, it is preferable to provide the cover with a second stop means adjacent the opening edge of the cover but disposed interiorly of the housing when the cover is in a closed position. Slight pressure will slide the cover over the end wall in either direction, which can be accomplished by forming the housing of a flexural composition, e.g. plastic, so as to provide a snap fit, and in this manner the cover is retained in a closed position without the need for any exteriorly disposed clips or snaps.

In an alternative embodiment of the invention, the housing includes a lateral extension along the longitudinal axis thereof and disposed substantially flush with the base. Preferably, the outer surface of the base, and the extensions, are provided with an inwardly disposed recess to accommodate the configuration of the fishing rod. A suitable fastening means, such as a VELCRO hook-and-pile strap, is provided for releasably mounting the carrier to the rod. Where desired, as in the case of the rod manufacturer, the carrier may be mounted or affixed to the rod by more permanent means such as with nylon thread wrapped around the rod and lateral extension to affix the carrier to the rod, and the thread typically has an adhesive coating to keep the thread secure.

BRIEF DESCRIPTION OF THE DRAWINGS

FIG. 1 is a perspective view of one embodiment of the fishing lure carrier of the present invention mounted on a fishing rod.

FIG. 2 is a plan view of the carrier of FIG. 1.

FIG. 3 is a side elevational view in cross-section taken on line 3—3 of FIG. 2.

FIG. 4 is a end view taken in cross-section on line 4—4 of FIG. 2.

FIG. 5 is an end view of the carrier of FIG. 2.

DETAILED DESCRIPTION OF THE INVENTION

Referring to the drawings wherein like reference numerals refer to similar parts throughout the various views, there is shown in FIG. 1 a perspective view of the carrier, indicated generally by the numeral 10, attached to a fishing rod 11 having a handle 12 and reel 13. The carrier 10 is shown as a box-like structure or housing 14 with the cover 15 in a partially open position. The housing 14 includes a base 16 and upwardly extending, opposed side walls 18 and 20 and opposed end walls 22 and 24, which intersect at the marginal edges to form the box-like carrier. The side walls and end walls are substantially normal to the base and substantially parallel to each other. Near or adjacent the top marginal edge of each side wall 18 and 20 there is provided a longitudinal recess extending substantially the complete length of the wall to serve as guide gibs 26 and 28 for the cover. It will be observed that the guide gibs are in opposed alignment on a plane transverse to the side walls, and are spaced remotely from the base. In this manner, the guide gibs, which are grooved or recessed to provide a sliding tongue and groove connection between the gibs 26 and 28 and cover 15, are adapted to receive the marginal edge portions of the cover for slidable movement along the gibs.

End wall 22 is provided with a horizontally disposed, elongated recess 30 at the upper or exposed periphery. Recess 30 extends between guide gibs 26 and 28 and is of a depth sufficient to accommodate the cover 15 and serve as a support or seat for the cover as it is moved between an open and closed position slidable along the guide gibs and across the recess. The opposed or second end wall 24 is about equal in height to the top edge of the guide gibs 26 and 28, and therefore when the cover 15 is moved to a closed position, the edge of the cover will abut this end wall thereby serving as a stop means. Also, end wall 24 is provided along the upper periphery with a centrally disposed, transverse slot or opening 32 of sufficient depth to accommodate the fishing line when the lure is encased in the carrier 10, but the opening 32 should not be so large as to permit the lure to escape from the carrier. Preferably, the slot 32 extends below the cover 15 so as to avoid any contact or cutting edge between the fishing line and cover. Desirably, cover 15 is provided with a handle 33 in order to facilitate slidable movement of the cover.

Formed integrally with the housing and extending laterally from end walls 22 and 24 are planar flanges or extensions 34 and 36 extending outwardly from the central longitudinal axis of the base 16 and preferably flush with the bottom surface of the base. The lateral flange members 34 and 36 provide added surface area on which to mount the carrier to the rod, and further provide a suitable connecting means useful in mounting the carrier to the rod, as explained below in greater detail. In a preferred embodiment, recess 38 extends longitudinally of the base 16 and flange members 34 and 36 for accommodating the circumference of the fishing rod so as to provide for a more secure mounting of the carrier to the rod, as explained below. Although the rod typically has a round cross-section, I have found that an angled recess, preferably from about 90° to 120°, will accommodate most size rods.

The cover 15 is provided with first stop means such as downwardly depending projecting detent or lug 40 spaced inwardly from the marginal edge of the cover so as to delimit the opening position of the cover. A second stop means such as downwardly depending projecting detent or lug 42 spaced inwardly or adjacent the opposed marginal edge of the cover will seat against the inner facing of end wall 22. The housing is formed from a plastic that is resilient or flexible, and when the cover is pushed closed by hand pressure from the fisherman, the end wall 22 allows for a flexural opening for accommodating passage of the detent 42 over the end wall, thereby frictionally securing the cover and preventing it from sliding open without the application of some pressure such as exerted by the fisherman. In this manner, the cover is secured in position but can be readily slid between an open and closed position. It is preferable to provide for two spaced apart detents as shown in the drawings in order to inhibit any side-wise movement or waggle. Where desired, the detents 40 or 42 may be a single bar or strip projecting downwardly from the cover.

The carrier is adapted to be mounted to the fishing rod at or adjacent the handle. Suitable fastening means for releasably mounting the carrier to the rod include VELCRO hook-and-pile fastening elements. As best shown in FIGS. 4 and 5, the VELCRO comprises a web 44 adaptable for encompassing or encircling part of the rod 46, and has on an outwardly disposed surface thereof one half of a hook-and-pile fabric fastener and on the opposed surface the complementary fastener half for adjoining in overlapping relation thereby holding the carrier in place.

I claim:

1. A fishing lure carrier to receive a fishing lure attached to a fishing line, comprising:
   (a) a housing adaptable for receiving said lure and having
   (i) a base, (ii) upwardly extending, opposed side walls and (iii) upwardly extending, opposed end walls; said base having an outwardly disposed recess extending longitudinally thereof and adaptable for accommodating a fishing rod;

(b) a slidable cover spaced from said base and substantially parallel thereto;

(c) each of said side walls having a guide gib extending longitudinally thereof and adaptable to receive opposed marginal edges of said cover for slidable movement along said guide gib, each of said guide gibs spaced remotely from said base;

(d) the first of said end walls having a horizontal marginal edge disposed below said cover to permit said cover to slide in said guide gibs across said horizontal marginal edge;

(e) a peripheral slot in the second of said end walls adapted to receive said line when said lure is positioned in said housing; whereby said cover being slidable in said guide gibs is adaptable to be slid to an open or closed position for providing access to said housing; and (e) said base including substantially planar extensions outwardly beyond each end wall, each of said extensions disposed flush with the bottom surface of said base, and each of said extensions having an outwardly disposed recess extending longitudinally thereof and aligned with said longitudinal recess in said base.

2. A fishing lure carrier according to claim 1 wherein said cover further includes stop means to delimit the opening position of said cover.

3. A fishing lure carrier according to claim 2 wherein said stop means comprises one or more detents positioned on the underside of said cover and aligned for abutment with the interiorly disposed face of said first end wall when said cover is slid to an open position.

4. A fishing lure carrier according to claim 2 wherein said end walls are formed of a substantially flexible material, and further includes closure means comprising one or more detents positioned on the underside of said cover and aligned for abutment with the interiorly disposed face of said first end wall when said cover is in a closed position, and said first end wall allowing for flexaral passage of said detent over said first end wall.

5. A fishing lure carrier according to claim 1 wherein each of said guide gibs comprises a longitudinal recess in said side wall for substantially the complete length thereof, whereby said guide gibs are in opposed alignment on a plane transverse to the side walls.

6. A fishing lure carrier according to claim 1 wherein said opposed side walls are substantially parallel, and said end walls are substantially parallel.

7. A fishing lure carrier according to claim 1 including means for releasably mounting said carrier to said rod.

8. A fishing lure carrier according to claim 1 including fastening means affixed to said extensions for releasably mounting said carrier to said rod, said means comprising a web adaptable for encompassing said rod and bearing on an outwardly disposed surface thereof one half of a hook-and-pile fabric fastener and on the opposed surface the complementary fastener half for adjoining in overlapping relation to hold said carrier in place.

9. In combination, a fishing rod having a handle portion at one end thereof and a fishing lure carrier formed integrally with said rod at or adjacent said handle portion, said carrier adapted to receive a fishing lure attached to a fishing line, said carrier comprising: (a) a housing adaptable for receiving said lure and having (i) a base having an outwardly disposed recess extending longitudinally thereof and adaptable for accommodating said fishing rod;, (ii) upwardly extending, opposed side walls and (iii) upwardly extending, opposed end walls, said base including substantially planar extensions outwardly beyond each end wall, each of said extensions disposed flush with the bottom surface of said base, and each of said extensions having an outwardly disposed recess extending longitudinally thereof and aligned with said longitudinal recess in said base; (b) a slidable cover spaced from said base and substantially parallel thereto, said cover adaptable for sliding between an open and closed position; (c) each of said side walls having a guide gib extending longitudinally thereof and adaptable to receive the marginal edge of said cover for slidable movement along said guide gib, each of said guide gibs spaced remote from said base; (d) the first of said end walls having a horizontally disposed, elongated recess at the periphery thereof and extending between said guide gibs to provide access for said cover in said guide gibs; and (e) the second of said end walls having a peripheral slot adapted to receive said line when said lure is positioned in said housing; whereby said cover being slidable in said guide gibs is adaptable to be slid to an open or closed position across said recess for providing access to said housing.

* * * * *